United States Patent [19]

Sugano

[11] Patent Number: 5,886,823
[45] Date of Patent: Mar. 23, 1999

[54] OPTICAL VISUAL APPARATUS

[75] Inventor: Yasuyuki Sugano, Tokyo, Japan

[73] Assignee: Sony Corporation, Japan

[21] Appl. No.: 848,267

[22] Filed: Apr. 29, 1997

[30] Foreign Application Priority Data

May 15, 1996 [JP] Japan .................................... 8-120636

[51] Int. Cl.⁶ .................................................. G02B 27/14
[52] U.S. Cl. ........................................................ 359/630
[58] Field of Search .................................... 359/630, 631, 359/633, 634, 636; 345/7, 8

[56] References Cited

U.S. PATENT DOCUMENTS

| | | | |
|---|---|---|---|
| 5,506,728 | 4/1996 | Edwards | 359/631 |
| 5,546,227 | 8/1996 | Yasugaki et al. | 359/630 |
| 5,621,572 | 4/1997 | Fergason | 359/630 |
| 5,654,827 | 8/1997 | Reichert | 359/631 |
| 5,712,649 | 1/1998 | Tosaki | 345/8 |

*Primary Examiner*—Georgia Epps
*Assistant Examiner*—Ricky Mack
*Attorney, Agent, or Firm*—Ronald P. Kananen

[57] ABSTRACT

The invention provides an optical visual apparatus which eliminates ghost light and is small in size and light in weight so that observation for a long time does not tire the eyes of a user and the user does not suffer from displacement of the apparatus on the head. A half mirror for reflecting image light from a two-dimensional display element is formed in a wedge-shaped profile having a varying thickness such that an opposing surface opposing to a half-coated surface is inclined with respect to the half-coated surface. The inclination angle of the opposing inclined surface and the Abbe's number of the half mirror are so set that ghost light and regular light are overlapped with each other at the position of an eye-ball of the user or the ghost light is reflected to the outside of the field of view of the user so that the ghost light may not be observed by the user.

13 Claims, 13 Drawing Sheets

F I G. 14
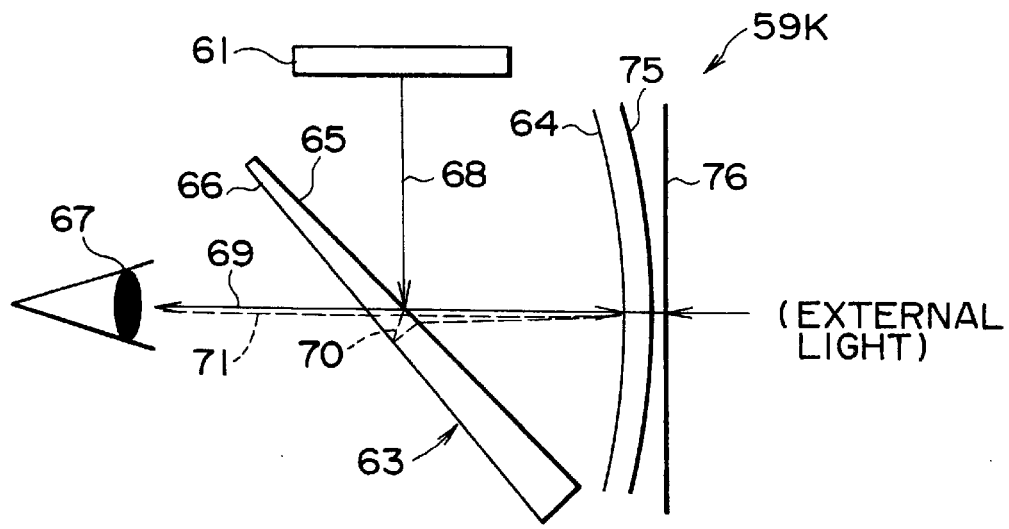
F I G. 15
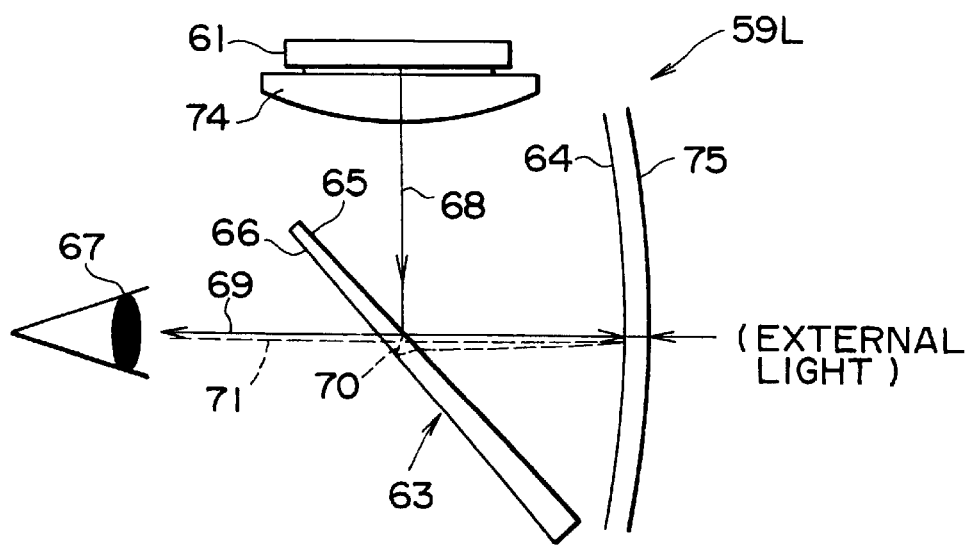

F I G. 21
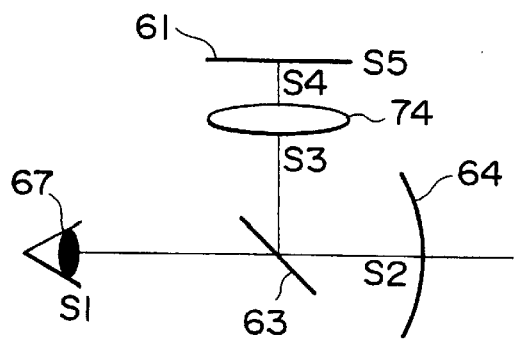
F I G. 22A
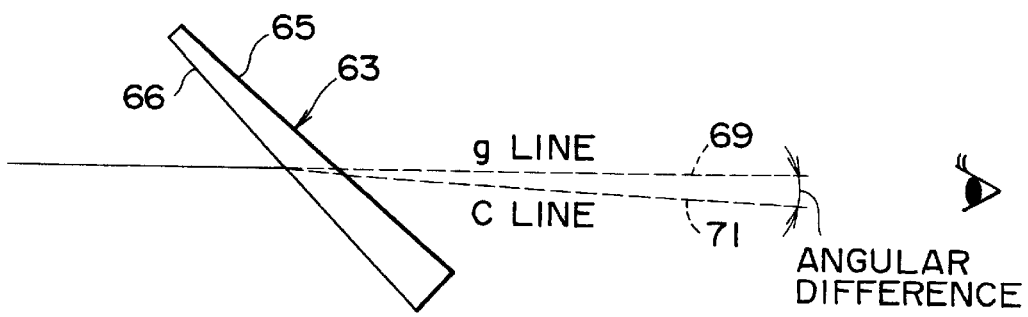
F I G. 22B
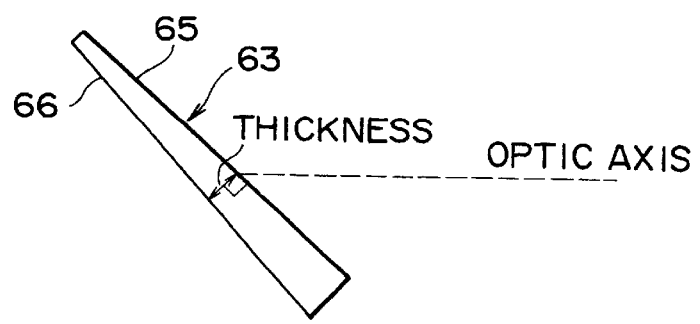

OPTICAL VISUAL APPARATUS

BACKGROUND OF THE INVENTION

This invention relates to an optical visual apparatus, and more particularly to a half mirror for use with a small size light-weighted optical visual apparatus which can be mounted on the head of a user.

Head-mounted display units for virtual reality, for medical care, for military use, for a computer or for individual enjoyment with a large screen are known as optical visual apparatus.

Further, in recent years, a head-mounted display unit with which an image from a two-dimensional display element formed form a CRT, an LCD or a like element is magnified as a virtual image to be observed draws attention and is developed.

In the head-mounted display unit just described, the system for magnifying an image form the two-dimensional display element as a virtual image to be observed is such as shown in FIG. 24. Referring to FIG. 24, the system includes a two-dimensional display element 10 for displaying an image, and a half mirror 20 in the form of a parallel plate of a predetermined thickness for branching an optical path. The half mirror 20 has a half-coated surface 21 on the side thereof into which light is introduced. The system further includes a concave mirror 22 for magnifying the image as a virtual image to be observed.

When a user of the two-dimensional display element having the construction described above tries to observe an image from the two-dimensional display element as a magnified virtual image, light 23 from the half mirror 20 illuminated with a light source unit not shown is branched by the half mirror 20. Light 24 reflected thereupon from the half-coated surface 21 toward the concave mirror 22 side is subsequently reflected by the concave mirror 22 and forms an optical path of regular light 26 which enters an eye-ball 25.

On the other hand, light 27 coming into the half mirror 20 refractively through the half-coated surface 21 is branched into light 28 which goes out through the opposite surface of the half mirror 20 and light 29 which is reflected by the opposite surface of the half mirror 20 and then goes out refractively through the half-coated surface 21 toward the concave mirror 22. The latter light 29 forms an optical path of ghost light 30 which is reflected from the concave mirror 22 and enters the eyeball 25.

In this manner, the half mirror 20 formed from a parallel plate of a predetermined thickness never fails to have an optical path of the light 29 which comes into and goes out from the half mirror 20, that is, the ghost light 30, unless it can totally reflect the incoming light the half-coated surface 21 thereof.

However, the optical visual apparatus which includes the two-dimensional display element 10 for displaying an image, the half mirror 20 for branching an optical path and the concave mirror 22 for magnifying the image as a virtual image to be observed has several problems to be solved. In particular, in the optical visual apparatus, when light from the two-dimensional display element 10 illuminated with the light source unit is branched by the half mirror 20, light 24 reflected from the half-coated surface 21 is magnified by the concave mirror 22 and observed as regular light 26. Simultaneously, however, light having passed through the half-coated surface 21 comes to the opposite surface of the half mirror 20, and most light 28 of it passes through the opposite surface, but part of the light is reflected from the opposite surface. The reflected light 29 passes refractively through the half-coated surface 21 and is then reflected by the concave mirror 22 to make ghost light 30 which enters the eye-ball 25 and is observed as a magnified virtual image.

When an image formed from the regular light 26 and another image formed from the ghost light 30 are observed simultaneously, the image composed of the two images becomes a double image as seen in FIG. 26 and the original image may not sometimes be recognized because such a double image is indistinct. Further, observation of such a double image for a long time tires the eyes.

On the other hand, if a beam splitter or a prism is used in order to eliminate the ghost light 30, then this gives rise to such problems that the apparatus is degraded in balance or in mounting feeling to the user or, when the apparatus is used for a long time, the apparatus is displaced on the head and the user cannot observe the image well.

Further, where external light is to be observed as see-through light, if a beam splitter or a prism is used, then the light is spectrally diffracted due to an angle characteristic of a coating on the beam splitter or by the prism. Consequently, the external image is colored and is so hard to observe that the original image cannot be observed regularly. Further, observation of such an image for a long time tires the eyes.

SUMMARY OF THE INVENTION

It is an object of the present invention to provide an optical visual apparatus which eliminates ghost light so that observation for a long time does not tire the eyes of a user.

It is another object of the present invention to provide an optical visual apparatus which is small in size and light in weight so that observation for a long time does not tire the eyes of a user and the user does not suffer from displacement of the apparatus on the head.

In order to attain the objects described above, according to the present invention, there is provided an optical visual apparatus, comprising a two-dimensional display element for displaying an image, a half mirror for branching an optical path from the two-dimensional display element, and a concave mirror for magnifying the image based on the optical path from the half mirror as a virtual image to be observed, the half mirror having a half-coated surface half-coated so as to reflect part of light of the image from the two-dimensional display element and pass the remaining part of the light therethrough while an opposing surface of the half mirror opposing to the half-coated surface is inclined with respect to the half-coated surface.

In the optical visual apparatus, since the half mirror is constructed such that the opposing surface thereof opposing to the half-coated surface is inclined with respect to the half-coated surface so that the half mirror may have a wedge-shaped profile having a varying thickness, it is possible to make ghost light overlapped with regular light reflected by the half mirror. Particularly where the ghost light and the regular light are overlapped with each other at the position of an eye-ball of the user, the user can observe only the regular light of a higher intensity but does not observe the ghost light. In other words, the ghost light can be eliminated only by the improvement in the half mirror. Consequently, the entire optical visual apparatus can be constructed in a comparatively small size with a comparatively low weight, and observation of the optical visual apparatus for a long time does not tire the eyes of the user nor cause displacement of the optical visual apparatus.

Or, since the half mirror in the optical visual apparatus is constructed in such a manner as described above, the optical visual apparatus may be constructed so that the optical path of the ghost light may be directed to the outside of the field of view of the user so as to prevent the ghost light from being observed by the user by suitably adjusting the inclination angle of the opposing inclined surface opposing to the half-coated surface of the half mirror, the thickness of the half mirror on the optical axis, the refractive index of the half mirror or some other parameter of the half mirror.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIGS. 6 to 16 are schematic views showing different forms of the display body shown in FIG. 2;

FIGS. 18 to 21 are schematic views showing different examples of the display body of FIG. 2;

FIGS. 22A and 22B are schematic views illustrating regular light and ghost light passing through a wedge-shaped half mirror having a varying thickness;

DESCRIPTION OF THE PREFERRED EMBODIMENT

An optical visual apparatus according to the present invention which employs a half mirror having a half-coated surface and an opposing phase which is inclined with respect to the half-coated surface so that the half-mirror has a wedge-shaped profile with a varying thickness is described below with reference to the drawings.

Figure 1:
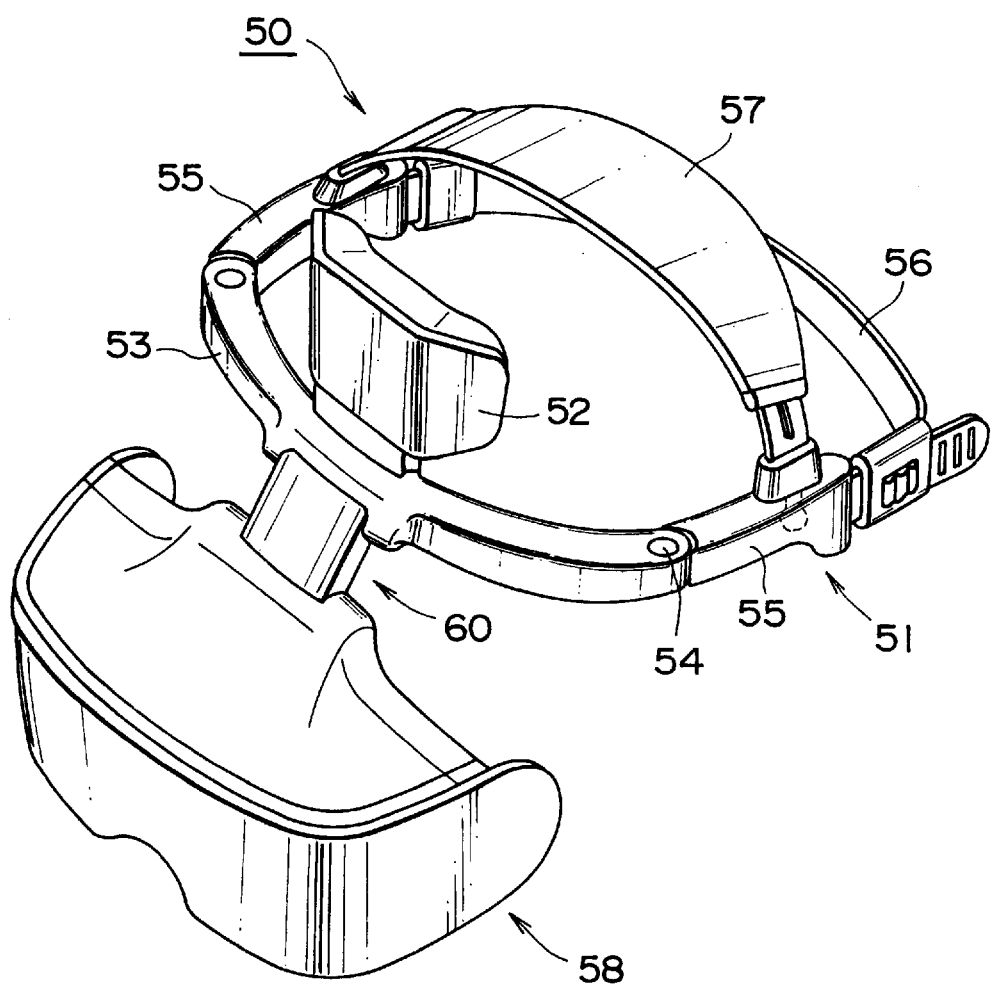
FIG. 1 is a perspective view showing an entire head-mounted display unit (HMD) as an optical visual apparatus to which the present invention is applied.

Referring first to FIG. 1, an optical visual apparatus 50 to which the present invention is applied includes a head mounted member 51, a display unit 58 supported on the head mounted member 51 at a location in front of and in an opposing relationship to the eyes of a user on which the optical visual apparatus 50 is mounted for forming an image in the eyes, and a connection member 60 for interconnecting the head mounted member 51 and the display unit 58 to support the display unit 58 at the location in front of the eyes.

The head mounted member 51 includes a head supported member 53 having a curved profile substantially conforming to the head of the user and connected to an end portion of the connection member 60. The head supported member 53 supports a base end portion of a forehead pad 52 for contacting with the forehead of the user. The head mounted member 51 further includes a pair of side cabinets 55 connected to the opposite ends of the head supported member 53 by a pair of hinges 54, a head circumference adjustment belt 56 connected for adjustment to the other ends of the side cabinets 55, and a hair band 57 connected to and located above the side cabinets 55 such that it extends along and adjustably holds a top portion of the head of the user.

The display unit 58 has a display body 59 formed from a housing having a shape substantially like goggles and covering the front of the display unit 58.

Figure 2:
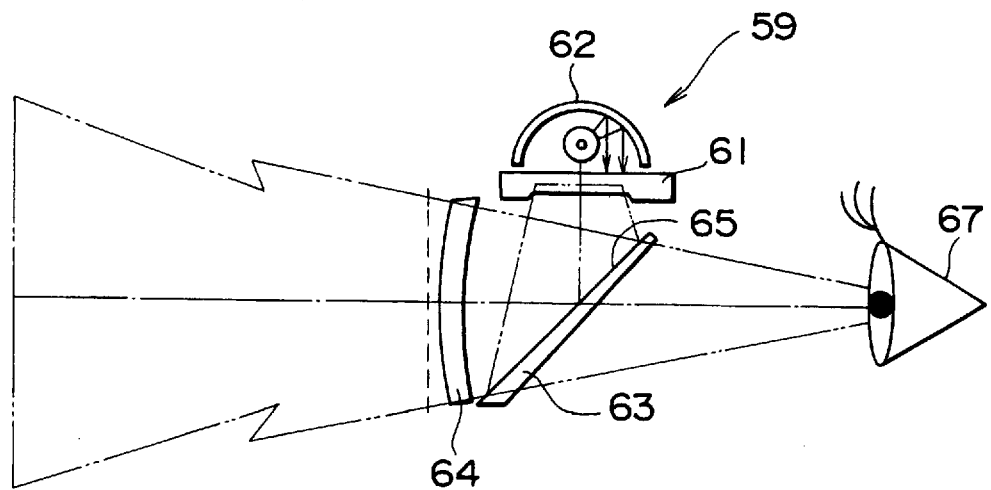
FIG. 2 is a schematic view showing a general construction of a display body of the head-mounted display unit of FIG. 1.

Referring to FIG. 2, the display body 59 includes a two-dimensional display element 61 for displaying an image in the inside of a housing, a light source unit 62 for supplying light to the two-dimensional display element 61, a half mirror 63 for changing an optical path of or passing an image from the two-dimensional display element 61, and a concave mirror 64 for magnifying the ray of light whose optical path has been changed by the half mirror 63 as a virtual image to be observed.

Figure 3:
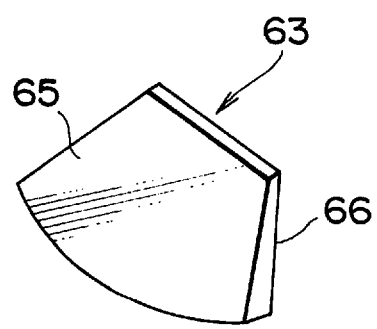
FIG. 3 is a perspective view showing a wedge-shaped half mirror employed in the display body shown in FIG. 2 and having a varying thickness.

The half mirror 63 is a flat plate having a substantially wedge-shaped profile with a varying thickness as seen in FIG. 3. A major surface of the half mirror 63 is formed as a half-coated surface 65 which reflects part of light of an image and transmits the remaining part of the light therethrough, and an opposing surface 66 of the half mirror 63 is inclined with respect to the half-coated surface 65.

Different forms of the display body having such a construction as described above will be described below.

Figure 4:
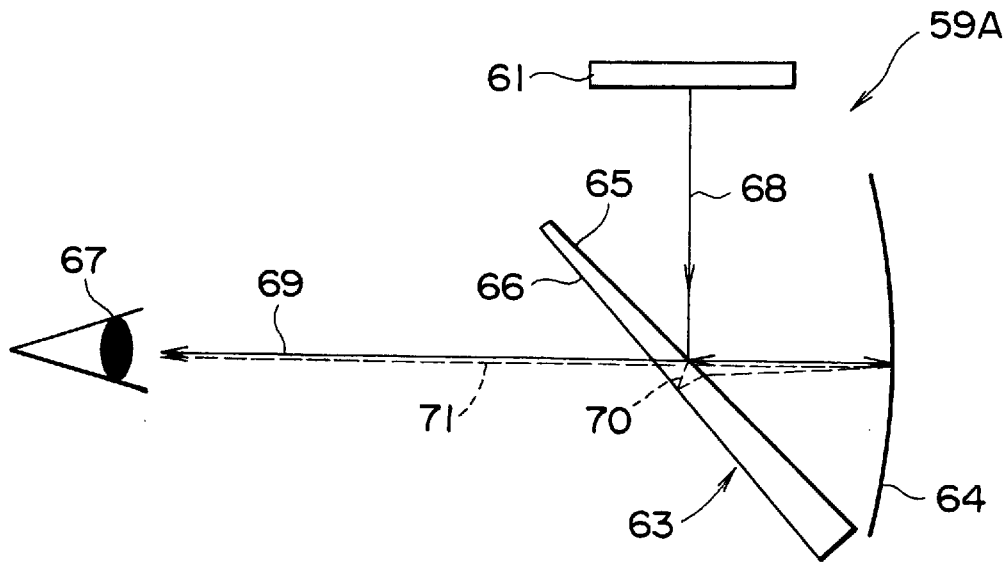
FIG. 4 is a schematic view showing a form of the display body shown in FIG. 2.

Referring first to FIG. 4, there is shown a first form of the display body. The display body of the first form is generally denoted at 59A and is constructed such that a wedge-shaped half mirror 63 formed as a flat plate having a varying thickness is disposed obliquely such that the thickness thereof gradually decreases upwardly.

In particular, the display body 59A is mounted on the head of the user such that the half mirror 63 is inclined at an inclination angle of approximately 45 degrees with the half-coated surface 65 thereof directed toward the two-dimensional display element 61 while a thicker portion thereof is positioned on the lower side.

The concave mirror 64 is positioned in an opposing relationship to an eye-ball 67 with the half mirror 63 interposed between the concave mirror 64 and the two-dimensional display element 61 positioned perpendicularly to the concave mirror 64.

In the display body 59A having such a construction as described above, light 68 of an image from the two-dimensional display element 61 illuminated with the light source unit not shown is branched by the half mirror 63 into regular light 69 which is reflected by the half-coated surface 65 and advances toward the concave mirror 64 and another light 70 which passes refractively through the half-coated surface 65. The light 70 passes through the inside of the half mirror 63 and comes to the opposing surface 66.

While most of the light 70 passes through and emerges outwardly from the opposing surface 66, part of the light 70 is reflected by the opposing surface 66 and makes ghost light 71. The ghost light 71 passes through the inside of the half mirror 63 again and comes to the half-coated surface 65.

Then, the ghost light 71 is refracted at the boundary between the half-coated surface 65 and the air and then advances toward the concave mirror 64. Thereafter, the ghost light 71 is reflected by the concave mirror 64 and then passes through the half mirror 63 again so that it is observed as a magnified virtual image by the user of the optical visual apparatus 50.

Figure 5:
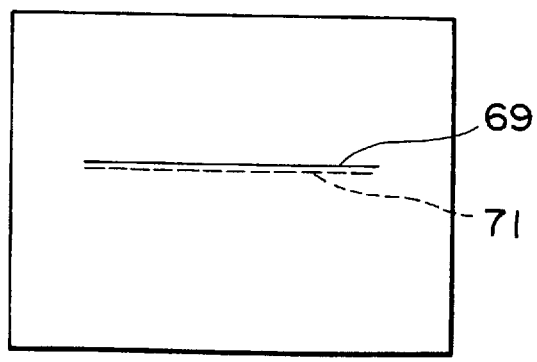
FIG. 5 is a schematic view illustrating regular light and ghost light coming into the same eye in an overlapping relationship where the display body shown in FIG. 2 is used.

Since this ghost light 71 is produced because an optical path difference or an angle difference from regular light is produced by the thickness and the refractive index of the half mirror 63 as seen from FIGS. 4 and 5, if the inclination angle of the opposing surface 66 opposing to the half-coated surface 65, the thickness of the half mirror 63 on the optic axis, the material of the half mirror 63 and so forth are varied so that the optical path of the ghost light 71 reflected by the concave mirror 64 and the optical path of the regular light 69 reflected by the concave mirror 64 may coincide with each other at the position of the eye-ball 67, then the regular light 69 and the ghost light 71 overlap with each other and only the regular light 69 having a higher intensity is observed by the user while the ghost light 71 is not observed. It is to be noted that, while it is shown in FIG. 4 that the regular light 69 and the ghost light 71 are not fully coincident with each other, there is merely for convenience of illustration, and actually, they coincide fully with each other and the ghost light 71 is not observed separately from the regular light 69.

Or, also if the inclination angle and the thickness on the optical axis of the half mirror 63 are adjusted so that the ghost light 71 is reflected to a position outside the field of view in which the user looks at a screen produced by the two-dimensional display element 61, it is possible to prevent the ghost light 71 from being observed by the user while only the regular light 69 is observed.

By using the wedge-shaped half mirror 63 having a varying thickness in this manner, an image free from ghost light can be realized. Thus, since ghost light can be eliminated only by the structure of the half mirror 63 without the necessity for any other structural element, improvement in performance and reduction in size and weight can be anticipated.

Figure 6:
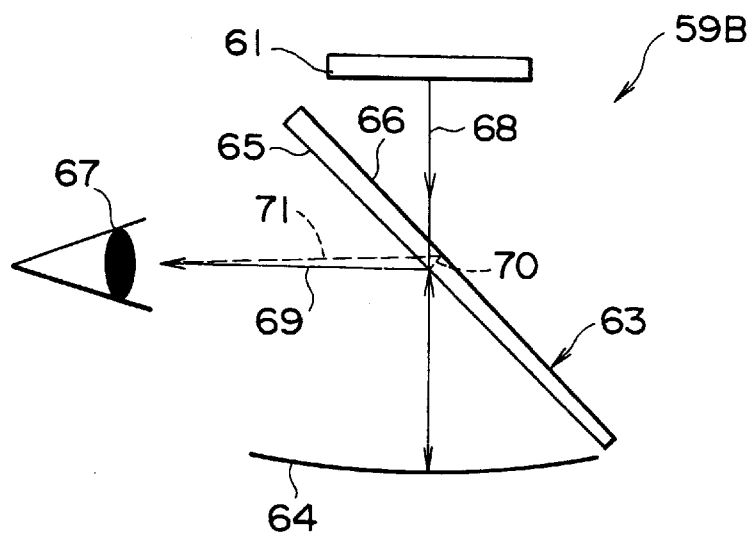

Referring now to FIG. 6, there is shown a second form of the display body. The display body of the second form is generally denoted at 59B and is a modification to but different from the display body 59A of the first form described with reference to FIG. 4 above in the mounting structure of the half mirror 63. In particular, the display body 59B is constructed such that the wedge-shaped half mirror 63 having a varying thickness is disposed obliquely such that it is inclined with an inclination angle of approximately 45 degrees with the half-coated surface 65 thereof directed toward the eye-ball 67 and a thicker portion thereof is positioned on the upper side while the concave mirror 64 is located adjacent the half-coated surface 65.

In the display body 59B having such a construction as described above, light 68 of an image from the two-dimensional display element 61 comes into the half mirror 63 and then advances straightforwardly until it is reflected by the concave mirror 64. The reflected light 70 from the concave mirror 64 is reflected toward the eye-ball 67 by the half-coated surface 65 of the half mirror 63 so that it makes regular light 69 which enters the eye-ball 67.

On the other hand, part of the light 70 reflected from the concave mirror 64 passes through the half-coated surface 65 and refractively comes into the half mirror 63. Then, the light 70 is branched by the opposing surface 66 opposing to the half-coated surface 65 into light which goes out into the air from the opposing surface 66 and ghost light 71 which is reflected by the opposing surface 66 opposing to the half-coated surface 65 and goes out refractively through the half-coated surface 65 so that it is introduced into the eye-ball 67.

Similarly as with the display body 59A of the first form described hereinabove with reference to FIG. 4, if the inclination angle of the opposing surface 66 opposing to the half-coated surface 65 of the half mirror 63, the thickness of the half mirror 63 on the optical axis, the material of the half mirror 63 and so forth are varied so that the optical path of the ghost light 71 reflected by the concave mirror 64 and the optical path of the regular light 69 reflected by the concave mirror 64 may coincide with each other at the position of the eye-ball 67, then the regular light 69 and the ghost light 71 overlap with each other, and consequently, only the regular light 69 having a higher intensity is observed by the user while the ghost light 71 is not observed.

Or, also if the inclination angle or the thickness on the optical axis of the half mirror 63, the material of the half mirror 63 or the like is varied so that the ghost light 71 is reflected to a position outside the field of view in which the user looks at a screen produced by the two-dimensional display element 61, it is possible to prevent the ghost light 71 from being observed by the user while only the regular light 69 is observed.

Figure 7:
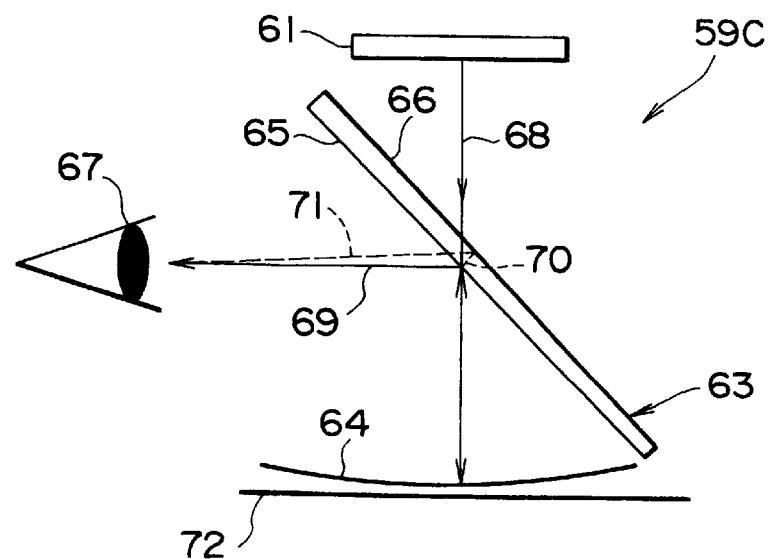

Referring now to FIG. 7, there is shown a third form of the display body. The display body of the third form is generally denoted at 59C and is a modification to but different from the display body 59B of the second form described with reference to FIG. 6 above in that it additionally includes a liquid crystal shutter 72 provided on the outer side of the concave mirror 64 and serving as means for adjusting the amount of light to be provided to the concave mirror 64.

In the display body 59C having the construction just described, production of regular light 69 and ghost light 71 and optical paths of them are similar to those in the display body 59B of FIG. 6, and overlapping description thereof is omitted here.

Since the display body 59C additionally includes the liquid crystal shutter 72, it becomes easier for the user to observe a condition of the external world, and a ray of light which may otherwise come to a location in front of the eye-ball 67 can be intercepted. Consequently, a clearer image can be observed.

Figure 8:
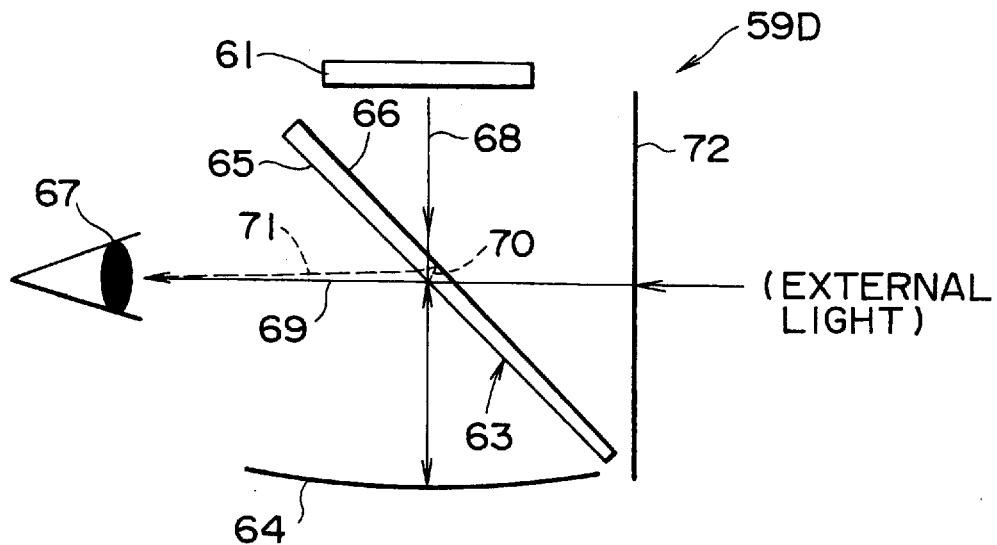

Referring now to FIG. 8, there is shown a fourth form of the display body. The display body of the fourth form generally denoted at 59D is a modification to but different from the display body 59C of the third form described with reference to FIG. 7 above in that the liquid crystal shutter 72 serving as means for adjusting the amount of light is located in an opposing relationship to the eye-ball 67 on the outer side of the half mirror 63.

Also in the display body 59D having the construction just described, production of regular light 69 and ghost light 71 and optical paths of them are similar to those in the display body 59B of FIG. 6, and overlapping description thereof is omitted here. Since the liquid crystal shutter 72 is located in an opposing relationship to the eye-ball 67, it becomes easier for the user to observe a condition of the external world, and a ray of light which may otherwise come to a location in front of the eye-ball 67 can be intercepted. Consequently, a clearer image can be observed.

Figure 9:
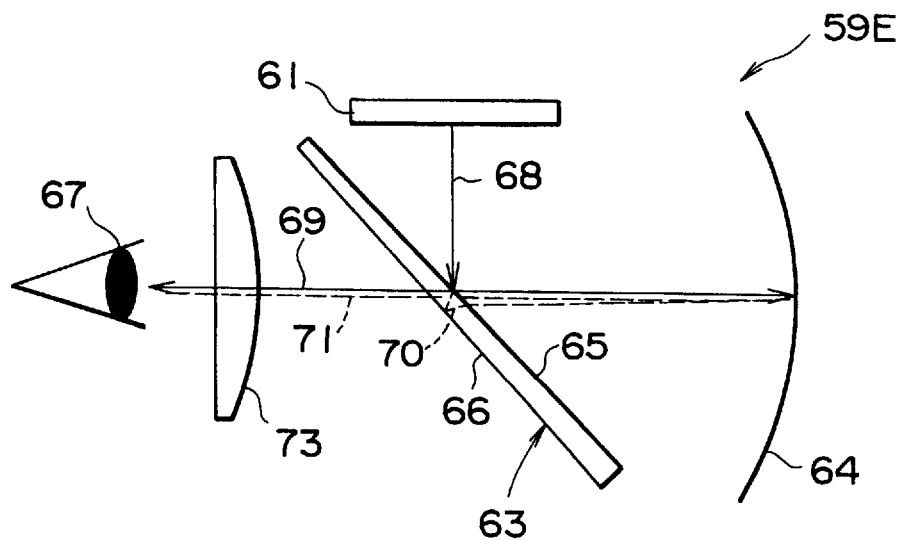

Referring now to FIG. 9, there is shown a fifth form of the display body. The display body of the fifth form generally denoted at 59E is a modification to but different from the display body 59A of the first form described with reference to FIG. 4 above in that a lens 73 is interposed between the half mirror 63 and the eye-ball 67.

Also in the display body 59E having the construction just described, production of regular light 69 and ghost light 71 and optical paths of them are similar to those in the display body 59A of FIG. 4, and overlapping description thereof is omitted here. Since the lens 73 is located in front of the eye-ball 67, the focus of an image of light introduced into the eye-ball 67 can be adjusted to the position of the eye-ball 67. Consequently, a clearer image can be observed.

Figure 10:
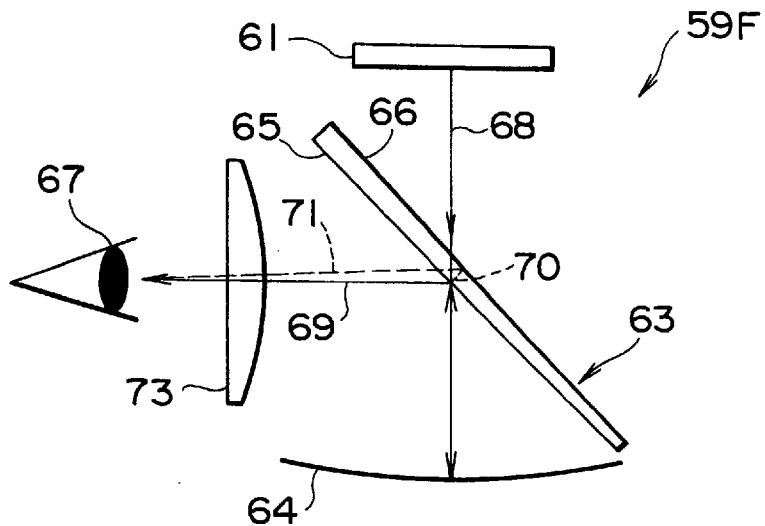

Referring now to FIG. 10, there is shown a sixth form of the display body. The display body of the sixth form generally denoted at 59F is a modification to but different from the display body 59B of the second form described with reference to FIG. 6 above in that a lens 73 is interposed between the half mirror 63 and the eye-ball 67.

Also in the display body 59F having the construction just described, production of regular light 69 and ghost light 71 and optical paths of them are similar to those in the display body 59B of FIG. 6, and overlapping description thereof is omitted here.

Since the lens 73 is located in front of the eyeball 67, similarly as in the display body 59E described hereinabove with reference to FIG. 9, the focus of an image of light introduced into the eye-ball 67 can be adjusted to the position of the eye-ball 67. Consequently, a clearer image can be observed.

Figure 11:
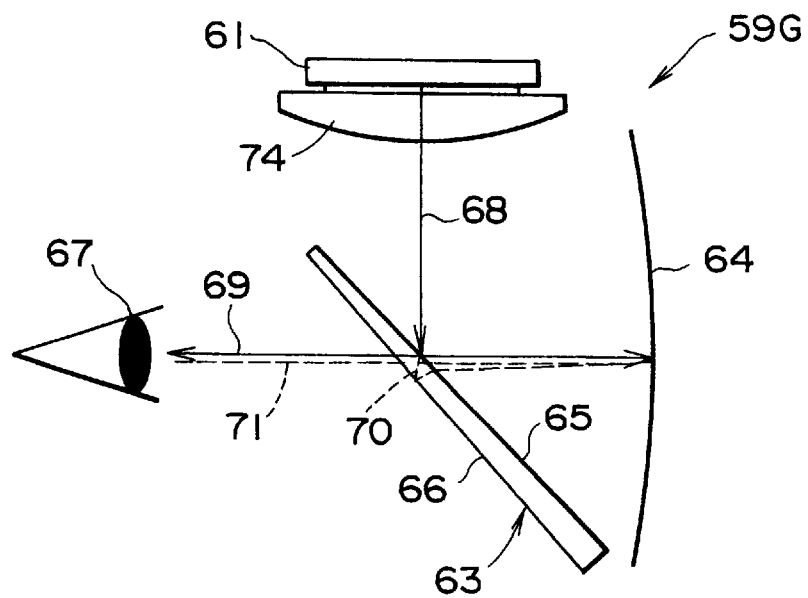

Referring now to FIG. 11, there is shown a seventh form of the display body. The display body of the seventh form generally denoted at 59G is a modification to but different from the display body 59A of the first form described with reference to FIG. 4 above in that a lens 74 is interposed between the half mirror 63 and the two-dimensional display element 61.

Also in the display body 59G having the construction just described, production of regular light 69 and ghost light 71 and optical paths of them are similar to those in the display body 59A of FIG. 4, and overlapping description thereof is omitted here. Since the lens 74 is located in front of the two-dimensional display element 61, the focus of the light 68 from the two-dimensional display element 61 can be adjusted to the position of the eye-ball 67. Consequently, a clearer image can be observed.

Figure 12:
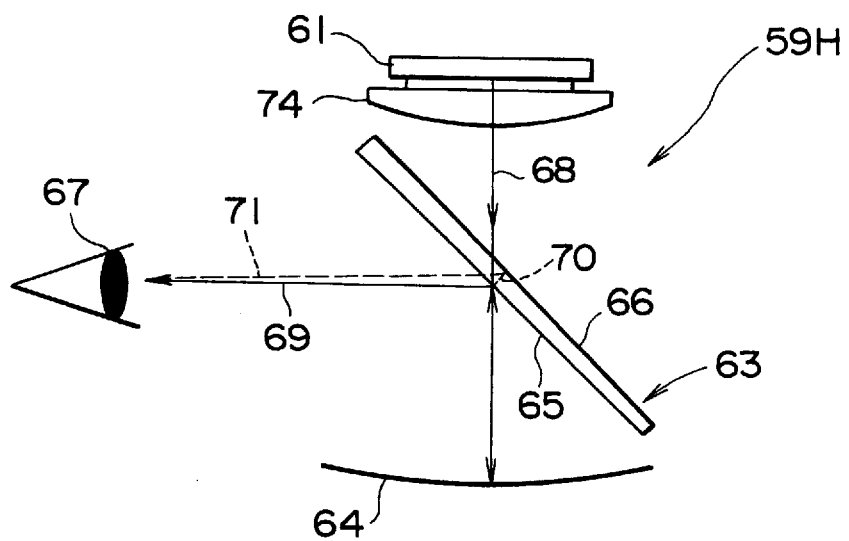

Referring now to FIG. 12, there is shown an eighth form of the display body. The display body of the eighth form generally denoted at 59H is a modification to but different from the display body 59B of the second form described with reference to FIG. 6 above in that a lens 74 is interposed between the half mirror 63 and the two-dimensional display element 61.

Also in the display body 59H having the construction just described, production of regular light 69 and ghost light 71 and optical paths of them are similar to those in the display body 59B of FIG. 6, and overlapping description thereof is omitted here. Since the lens 74 is located in front of the two-dimensional display element 61, the focus of the light 68 from the two-dimensional display element 61 can be adjusted to the position of the eye-ball 67. Consequently, a clearer image can be observed.

Figure 13:
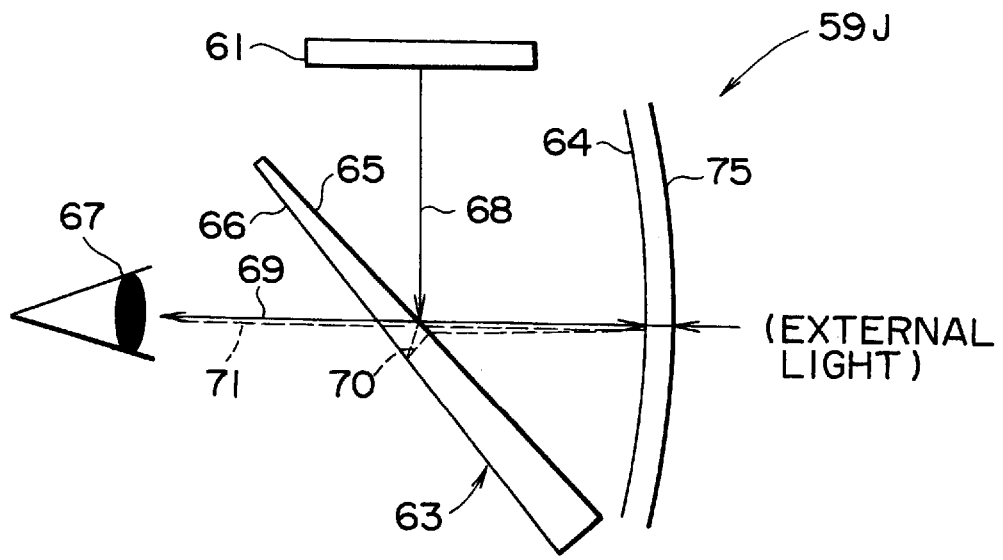

Referring now to FIG. 13, there is shown a ninth form of the display body. The display body of the ninth form generally denoted at 59J is a modification to but different from the display body 59A of the first form described with reference to FIG. 4 above in that the concave mirror 64 is located in an opposing relationship to the eye-ball 67 and is half-coated on a reflection surface thereof adjacent the eye-ball 67 while a transmission surface 75 through which light from the external world can pass is provided on the outer side of the concave mirror 64.

Also in the display body 59J having the construction just described, production of regular light 69 and ghost light 71 and optical paths of them are similar to those in the display body 59A of FIG. 4, and overlapping description thereof is omitted here. Since the concave mirror 64 is half-coated on the reflection surface thereof, the user can observe an image from the two-dimensional display element 61 while observing the external world.

Referring now to FIG. 14, there is shown a tenth form of the display body. The display body of the tenth form generally denoted at 59K is a modification to but different from the display body 59J of the ninth form described with reference to FIG. 13 above in that a liquid crystal shutter 76 serving as means for adjusting the amount of light is provided on the external world side of the concave mirror 64 which is half-coated on the semispherical reflection surface thereof and has the transmission surface 75 provided on the outer side thereof.

Also in the display body 59K having the construction just described, production of regular light 69 and ghost light 71 and optical paths of them are similar to those in the display body 59A of FIG. 4, and overlapping description thereof is omitted here. Since the transmission surface 75 which passes light of the external world therethrough is provided on the outer side of the concave mirror 64 serving as a lens member and the liquid crystal shutter 76 is provided on the external world side of the concave mirror 64, the user can observe an image from the two-dimensional display element 61 while observing the external world. Further, when the user wants to observe only the image from the two-dimensional display element 61, the user may operate so as to close the liquid crystal shutter 76, but when the user wants to observe the external world, the user may operate so as to open the liquid crystal shutter 76.

Referring now to FIG. 15, there is shown an eleventh form of the display body. The display body of the eleventh form generally denoted at 59L is a modification to but different from the display body 59G of the seventh form described with reference to FIG. 11 above in that the concave mirror 64 is located in an opposing relationship to the eye-ball 67 and is half-coated on a reflection surface thereof adjacent the eye-ball 67 while a transmission surface 75 through which external light can pass is provided on the outer side of the concave mirror 64.

Also in the display body 59K having the construction just described, production of regular light 69 and ghost light 71 and optical paths of them are similar to those in the display body 59A of FIG. 4, and overlapping description thereof is omitted here. Since the lens 74 is located in front of the two-dimensional display element 61, the focus of the light 68 from the two-dimensional display element 61 can be adjusted to the position of the eye-ball 67. Consequently, a clearer image can be observed. Further, since the concave mirror 64 is half-coated on the reflection surface thereof and the transmission surface 75 is provided on the outer side of the concave mirror 64, a ray of light from the external world can be inputted to the display body 59L, and the user can observe an image from the two-dimensional display element 61 while observing the external world.

Figure 16:
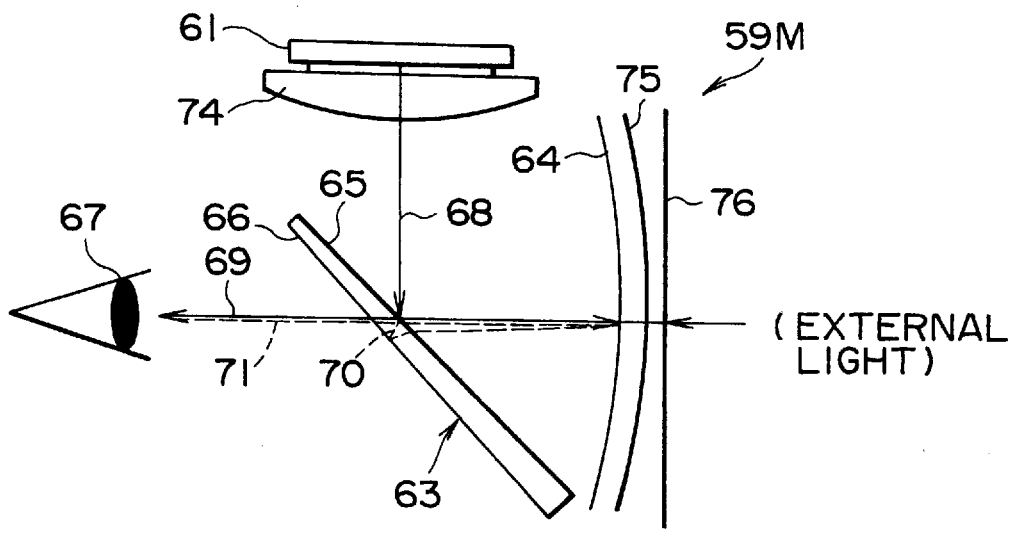

Referring now to FIG. 16, there is shown a twelfth form of the display body. The display body of the twelfth form generally denoted at 59M is a modification to but different from the display body 59L of the eleventh form described with reference to FIG. 15 above in that the concave mirror 64 is half-coated on the reflection surface thereof adjacent the eye-ball 67 and has the transmission surface 75 provided on the outer side thereof and a liquid crystal shutter 76 serving as means for adjusting the amount of light is provided on the external world side of the concave mirror 64.

Also in the display body 59M having the construction just described, production of regular light 69 and ghost light 71 and optical paths of them are similar to those in the display body 59A of FIG. 4, and overlapping description thereof is omitted here. Since the lens 74 is located in front of the two-dimensional display element 61, the focus of the light 68 from the two-dimensional display element 61 can be adjusted to the position of the eye-ball 67. Consequently, the user can observe a clearer image while observing the external world, and when the user wants to observe only the image from the two-dimensional display element 61, the user may operate so as to close the liquid crystal shutter 76, but when the user wants to observe the external world, the user may operate so as to open the liquid crystal shutter 76.

Figure 17:
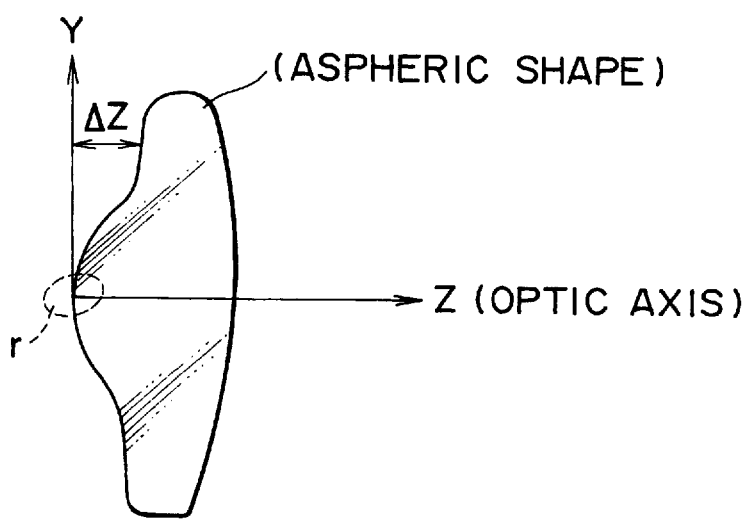
FIG. 17 is a graph showing the distance of an aspherical profile.

FIGS. 18 to 21 show different examples used in simulation conducted varying the construction of the basic optical system and the positional relationship of the lenses 73 and 74 ignoring the thickness of the half mirror 63. In the simulation, the radius of curvature r, the surface separation d, the refractive index nd, the Abbe's number vd and the aspherical surface coefficients K, A, B, C and D in the optical path to the eye-ball 67 including the lens 73 or lens 74 and the concave mirror 64 are calculated. Meanwhile, FIG. 17 shows the aspherical surface profile in regard to the distance between the same and the optical axis. For the aspherical surface profile, in FIG. 17, the direction of the optical axis is taken as the Z axis and a direction perpendicular to the optical axis (Z axis) is taken as the Y axis, and the advancing direction of light is represented in the positive. Then, using the paraxial radius of curvature r and the aspherical surface coefficients K, A, B, C and D, the distance $\Delta Z$ in the Z-axis direction (direction of the optical axis) is calculated based on the following expression (1):

$$\Delta Z = \frac{Y^2/r}{1 + \sqrt{1 - (1+K) \cdot (Y/r)^2 Y^2}} + AY^4 + BY^6 + CY^8 + DY^{10}$$

Figure 18:
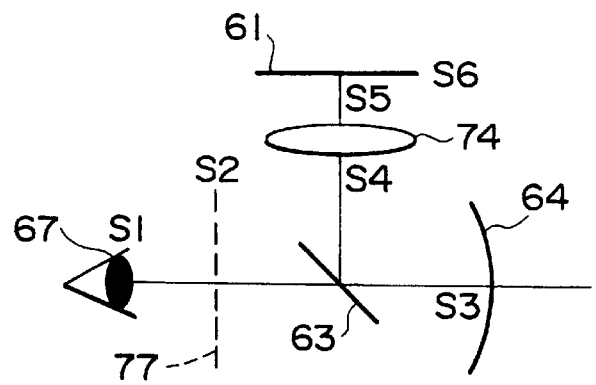

In the first example, as seen from FIG. 18 and Tables 1 and 2 given below, a concave mirror 64 having a focal length f=27.0 mm is disposed on the same straight line as an eye-ball 67 while a two-dimensional display element (LCD) 61 is disposed on a line perpendicular to the straight line and a lens 74 is located adjacent the two-dimensional display element (LCD) 61. Accordingly, the present example has a similar construction to that of the display body 59G of the seventh form described hereinabove with reference to FIG. 11.

As surfaces to be observed, the position of the eye-ball 67 is determined as a first surface S1, the location of a viewing window 77 as a second surface S2, the reflection surface of the concave mirror 64 as a third surface S3, the light emergence surface of the lens 74 as a fourth surface S4, the light incidence surface of the lens 74 as a fifth surface S5, and a surface on which an image from the two-dimensional display element 61 is displayed is determined as a sixth surface S6. Then, the surface separation is calculated based on the expression (1) given above. The aspherical surface coefficient or coefficients to be substituted into the expression (1) in this instance are the third surface S3 and the fourth surface S4 as seen from Table 2 given below. Here, "d" of the refractive index nd appearing in the tables given below represents light of a d ray (wavelength: 587.56 mm).

TABLE 1

[EXAMPLE 1]
FOCAL LENGTH 1 f = 27.00 mm

| SURFACE NUMBER | RADIUS OF CURVATURE | SURFACE SEPARATION (mm) | REFRACTIVE INDEX (nd) | ABBE'S NUMBER (vd) |
|---|---|---|---|---|
| S0 | $r_0 = \infty$ (VIRTUAL IMAGE) | $d_0 = -2000.0$ | | |
| S1 | $r_1 = \infty$ (PUPIL POSITION) | $d_1 = 20.0$ | | |
| S2 | $r_2 = \infty$ | $d_2 = 27.0$ | | |
| S3 | $r_3 = -61.237$ (CONCAVE MIRROR) | $d_3 = -25.6$ | | |
| S4 | $r_4 = -18.406$ (LENS) | $d_4 = -4.55$ | $nd_4 = 1.49154$ | $vd_4 = 58.0$ |
| S5 | $r_5 = \infty$ | $d_5 = -1.0$ | | |
| S6 | $r_6 = \infty$ | | | |

TABLE 2

| ASPHERICAL SURFACE COEFFICIENT OF THIRD SURFACE | ASPHERICAL SURFACE COEFFICIENT OF FOURTH SURFACE |
|---|---|
| $K_3 = 0.14431E + 01$ | $K_4 = 0.12758E + 01$ |
| $A_3 = 0.50200E - 06$ | $A_4 = -0.25025E - 03$ |
| $B_3 = 0.18931E - 08$ | $B_4 = 0.78300E - 05$ |
| $C_3 = -0.61974E - 11$ | $C_4 = -0.10653E - 06$ |
| $D_3 = 0.76573E - 14$ | $D_4 = 0.52602E - 09$ |

Figure 19:
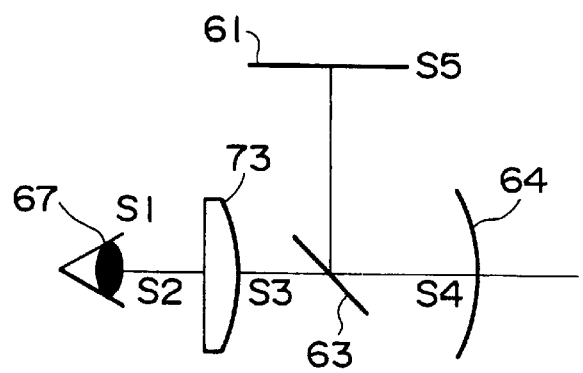

In the second example, as seen from FIG. 19 and Tables 3 and 4 given below, a concave mirror 64 having a focal length f=29.88 mm is disposed on the same straight line as an eye-ball 67 while a lens 73 is disposed adjacent the eye-ball 67 on the strait line and a two-dimensional display element (LCD) 61 is disposed on a line perpendicular to the straight line. Accordingly, the present example has a similar construction to that of the display body 59E of the fifth form described hereinabove with reference to FIG. 9.

As surfaces to be observed, the position of the eye-ball 67 is determined as a first surface S1, the light emergence surface of the lens 73 as a second surface S2, the light incidence surface of the lens 73 as a third surface S3, the reflection surface of the concave mirror 64 as a fourth surface S4, and the surface on which an image from the two-dimensional display element (LCD) 61 is displayed is determined as a fifth surface S5. Then, the surface separation is calculated based on the expression (1) given above. The aspherical surface coefficient or coefficients to be substituted into the expression (1) in this instance are the second surface S2, the third surface S3 and the surface S4 as seen from Table 4 given below.

TABLE 3

[EXAMPLE 2]
FOCAL LENGTH f = 29.88 mm

| SURFACE NUMBER | RADIUS OF CURVATURE | SURFACE SEPARATION (mm) | REFRACTIVE INDEX (nd) | ABBE'S NUMBER (vd) |
|---|---|---|---|---|
| S0 | $r_0 = \infty$ (VIRTUAL IMAGE) | $d_0 = -2000.0$ | | |
| S1 | $r_1 = \infty$ (PUPIL POSITION) | $d_1 = 25.0$ | | |
| S2 | $r_2 = -66.832$ (LENS) | $d_2 = 5.4$ | $nd_2 = 1.49154$ | $vd_2 = 58.0$ |
| S3 | $r_3 = -34.019$ | $d_3 = 21.5$ | | |
| S4 | $r_4 = -66.618$ (CONCAVE MIRROR) | $d_4 = -25.42$ | | |
| S5 | $r_5 = \infty$ (LCD) | | | |

TABLE 4

| ASPHERICAL SURFACE COEFFICIENT OF SECOND SURFACE (S2) | ASPHERICAL SURFACE COEFFICIENT OF THIRD SURFACE (S3) | ASPHERICAL SURFACE COEFFICIENT OF FOURTH SURFACE (S4) |
|---|---|---|
| $K_2 = -100.0$ | $K_3 = -0.64617E + 01$ | $K_4 = 0.72422E + 01$ |
| $A_2 = -0.16325E - 03$ | $A_3 = -0.13760E - 03$ | $A_4 = 0.67310E - 05$ |
| $B_2 = 0.155225E - 06$ | $B_3 = 0.114620 - E06$ | $B_4 = -0.83918E - 08$ |
| $C_2 = -0.24778E - 08$ | $C_3 = -0.709600 - E09$ | $C_4 = -0.16650E - 10$ |
| $D_2 = 0.38320E - 11$ | $D_3 = -0.159270 - E11$ | $D_4 = 0.41881E - 13$ |

Figure 20:
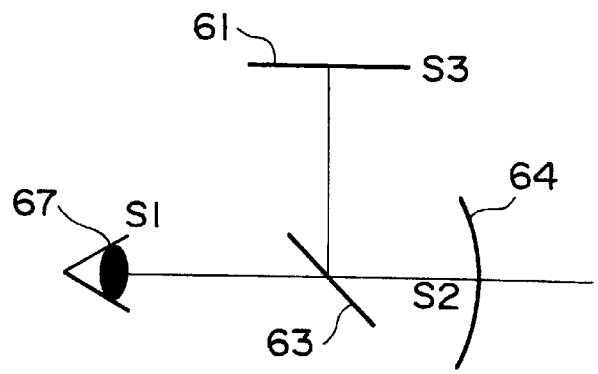
Figure 23:
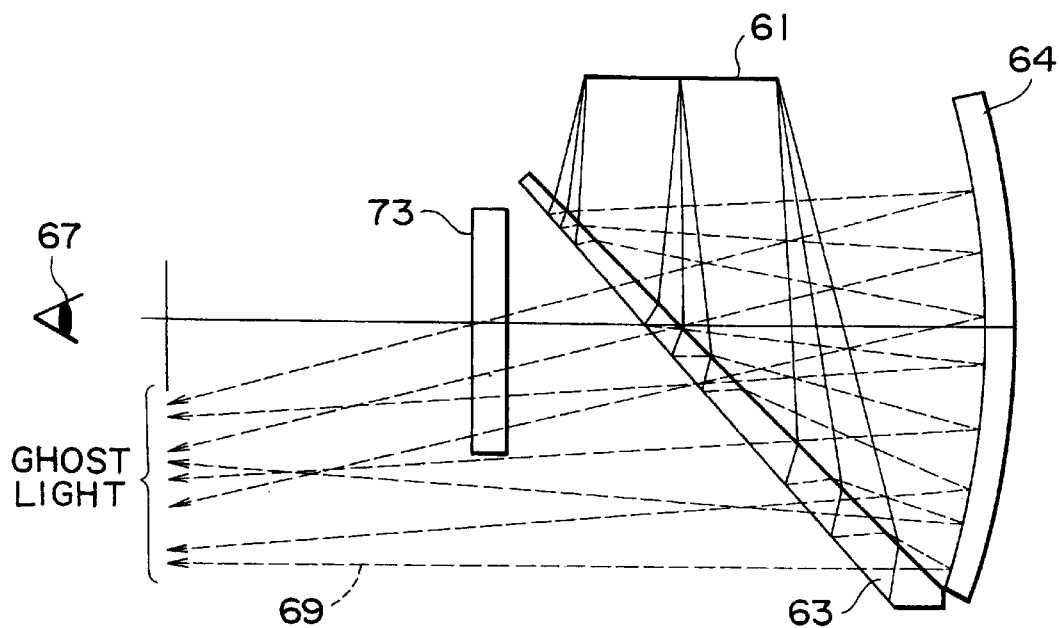
FIG. 23 is a schematic view illustrating ghost light reflected to the outside of a field of view.
Figure 24:
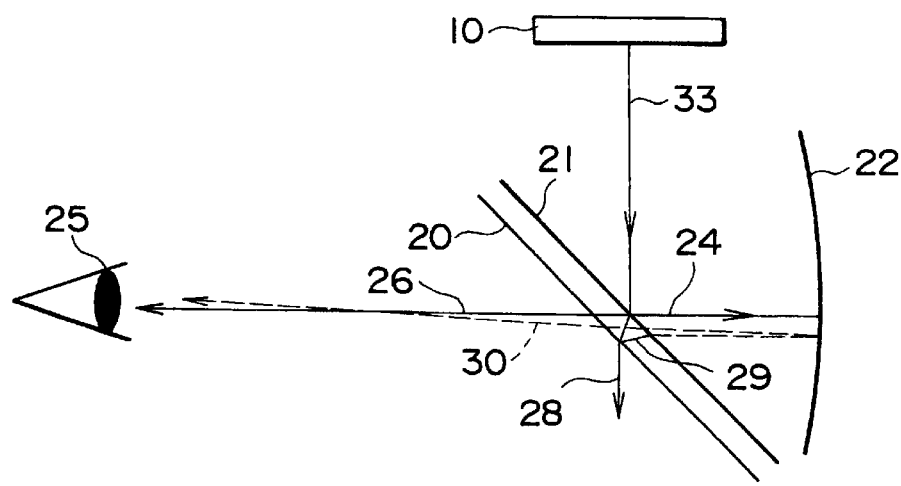
FIG. 24 is a schematic view showing an ordinary display body which employs a half mirror formed as a parallel plate.
Figure 25:
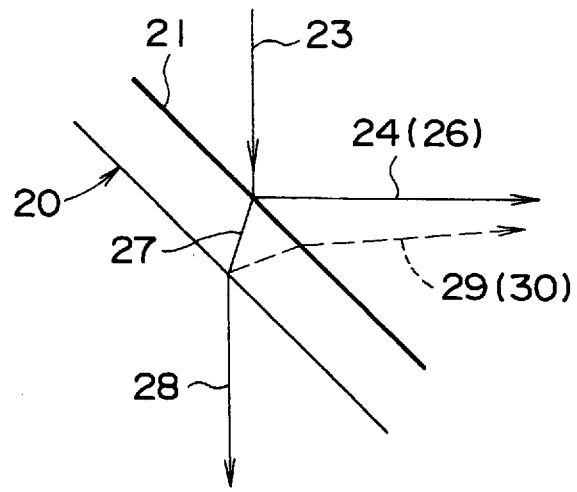
FIG. 25 is a schematic view showing optical paths provided by the half mirror shown in FIG. 24.
Figure 26:
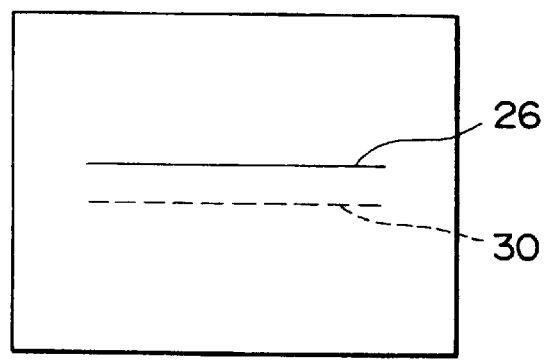
FIG. 26 is a schematic view showing regular light and ghost light coming into an eye-ball from the display body shown in FIG. 24.

In the third example, as seen from FIG. 20 and Tables 5 and 6 given below, a concave mirror 64 having a focal length f=27.00 mm is disposed on the same straight line as an eye-ball 67 while a two-dimensional display element (LCD) 61 is disposed on a line perpendicular to the straight line. Accordingly, the present example has a similar construction to that of the display body 59A of the first form described hereinabove with reference to FIG. 4.

As surfaces to be observed, the position of the eye-ball 67 is determined as a first surface S1, the reflection surface of the concave mirror 64 as a second surface S2, and the surface on which an image from the two-dimensional display element (LCD) 61 is displayed is determined as a third surface S3. Then, the surface separation is calculated based on the expression (1) given above. The aspherical surface coefficient or coefficients to be substituted into the expression (1) in this instance are the second surface S2 as seen from Table 6 given below.

TABLE 5

[EXAMPLE 3]
FOCAL LENGTH f = 27.00 mm

| SURFACE NUMBER | RADIUS OF CURVATURE | SURFACE SEPARATION (mm) |
|---|---|---|
| S0 | $r_0 = \infty$ (VIRTUAL IMAGE) | $d_0 = -2000.0$ |
| S1 | $r_1 = \infty$ (PUPIL POSITION) | $d_1 = 46.50$ |

TABLE 5-continued

[EXAMPLE 3]
FOCAL LENGTH f = 27.00 mm

| SURFACE NUMBER | RADIUS OF CURVATURE | SURFACE SEPARATION (mm) |
|---|---|---|
| S2 | $r_2 = -60.000$ (CONCAVE MIRROR) | $d_2 = -29.55$ |
| S3 | $r_3 = \infty$ (LCD) | |

TABLE 6

ASPHERICAL SURFACE COEFFICIENT OF SECOND SURFACE (S2)

$K_2 = -0.79543E + 01$
$A_2 = -0.48736E - 05$
$B_2 = 0.48657E - 08$
$C_2 = -0.12418E - 10$
$D_2 = 0.15767E - 13$

In the fourth example, as seen from FIG. 21 and Tables 7 and 8 given below, a concave mirror 64 having a focal length f=26.0 mm is disposed on the same straight line as an eye-ball 67 while a two-dimensional display element (LCD) 61 is disposed on a line perpendicular to the straight line and a lens 74 is located adjacent the two-dimensional display element (LCD) 61. Accordingly, the present example has a similar construction to that of the display body 59G of the seventh form described hereinabove with reference to FIG. 11.

As surfaces to be observed, the position of the eye-ball 67 is determined as a first surface S1, the reflection surface of the concave mirror 64 as a second surface S2, the light emergence surface of the lens 74 as a third surface S3, the light incidence surface of the lens 74 as a fourth surface S4, and the surface on which an image from the two-dimensional display element (LCD) 61 is displayed is determined as a fifth surface S5. Then, the surface separation is calculated based on the expression (1) given above. The aspherical surface coefficient or coefficients to be substituted into the expression (1) in this instance are the second surface S3, the third surface S3 and the fourth surface S4 as seen from Table 8 given below.

TABLE 7

[EXAMPLE 4]
FOCAL LENGTH f = 26.00 mm

| SURFACE NUMBER | RADIUS OF CURVATURE | SURFACE SEPARATION (mm) | REFRACTIVE INDEX (ud) | ABBE'S NUMBER (vd) |
|---|---|---|---|---|
| S0 | $r_0 = \infty$ (VIRTUAL IMAGE) | $d_0 = -2000.0$ | | |
| S1 | $r_1 = \infty$ (PUPIL POSITION) | $d_1 = 46.50$ | | |
| S2 | $r_2 = -62.822$ (CONCAVE MIRROR) | $d_2 = -23.50$ | | |
| S3 | $r_3 = 168.47$ (LENS) | $d_3 = -4.45$ | $nd_3 = 1.49154$ | $vd_3 = 58.0$ |
| S4 | $r_4 = 10.624$ | $d_4 = -3.79$ | | |
| S5 | $r_5 = \infty$ | | | |

TABLE 8

| ASPHERICAL SURFACE COEFFICIENT OF SECOND SURFACE | ASPHERICAL SURFACE COEFFICIENT OF THIRD SURFACE | ASPHERICAL SURFACE COEFFICIENT OF FOURTH SURFACE |
|---|---|---|
| $K_2 = -0.12636E + 01$ | $K_3 = 0.86326E + 02$ | $K_4 = -0.55900E + 00$ |
| $A_2 = 0.31847E - 06$ | $A_3 = -0.33159E - 03$ | $A_4 = -0.10200E - 02$ |
| $B_2 = -0.56388E - 08$ | $B_3 = 0.17386E - 05$ | $B_4 = 0.98432E - 05$ |
| $C_2 = 0.15590E - 10$ | $C_3 = 0.63414E - 08$ | $C_4 = -0.41761E - 07$ |
| $D_2 = -0.15520E - 13$ | $D_3 = 0.62092E - 10$ | $D_4 = 0.33410E - 10$ |

Subsequently, different forms of the half mirror 63 which can be applied to the first to fourth examples which employs the basic optical system described above will be described with reference to FIGS. 22A and 22B and Tables 9 and 10.

In the half mirror 63 of a wedge-shaped profile having a varying thickness, as the Abbe's number vd decreases, the angular difference between colors by the wavelength increases, and the external world looks with some color. Further, as the inclination angle θm of the opposing surface 66 increases, the prism action increases, and the external world looks with some color.

In particular, referring to FIG. 22A, as the Abbe's number vd decreases or the inclination angle θm of the inclined angle increases, white light from the external world which enters from the opposing surface 66 side of the half mirror 63 is refracted by the prism action so that it enters the eye-ball with an angular difference between a C ray of red light (wavelength: 656.27 mm) and a g ray of blue light (wavelength: 435.83 mm). The angular difference between the colors by the wavelength is represented as an angular difference of refracted rays of light of Tables 9 and 10 and relates to the Abbe's number vd and the thickness of a normal line on the optical axis shown in FIG. 22B (that is, the inclination angle θm). Here, "d" of the Abbe's number vd represents light of 587.56 mm.

A fifth example relates to a result of simulation of the relationship between the g ray 71 of blue light and the C ray 71 of red light making use of such a half mirror 63 of a wedge-shaped profile having a varying thickness as shown in FIG. 22A. In the simulation, the refractive index nd, the Abbe's number vd and the angular difference of refracted rays of the C and g rays are calculated from the inclination angle θm of the opposing surface 66 opposing to the half-coated surface 65 and the thickness on the optical axis of the half mirror 63 of a wedge-shaped profile having a varying thickness. In Table 9 given below, the inclination angle θm of the opposing surface 66, the thickness d on the optical axis, the refractive index nd, the Abbe's number vd and the angular difference between refracted rays of the C and g rays are listed. From Table 9, it can be recognized readily that, in order to restrict the angular difference between the red light C ray 69 and the blue light g ray 71 within an allowable range using the half mirror 63 of a wedge-shaped profile having a varying thickness, the condition given by the following expression:

Abbe's number vd>45 should be satisfied.

TABLE 9

[EXAMPLE 5]

| | INCLINATION ANGLE OF INCLINED FACE (Θm°) | THICKNESS ON OPTICAL AXIS (mm) | REFRACTIVE INDEX (nd) | ABBE'S NUMBER (vd) | ANGULAR DIFFERENCE BETWEEN RAYS OF C & g RAYS |
|---|---|---|---|---|---|
| 1 | 1.1746 | 1.0 | 1.492 | 58.0 | 0.00040 |
| 2 | 1.6972 | 1.5 | 1.492 | 58.0 | 0.00057 |
| 3 | 2.1773 | 2.0 | 1.492 | 58.0 | 0.00071 |
| 4 | 0.9845 | 1.0 | 1.600 | 45.0 | 0.00053 |
| 5 | 1.4243 | 1.5 | 1.600 | 45.0 | 0.00075 |
| 6 | 1.8300 | 2.0 | 1.600 | 45.0 | 0.00095 |
| 7 | 1.1191 | 1.0 | 1.520 | 64.0 | 0.00036 |
| 8 | 1.6176 | 1.5 | 1.520 | 64.0 | 0.00051 |
| 9 | 2.0759 | 2.0 | 1.520 | 64.0 | 0.00065 |

If the fifth example and any of the results of simulation of the basic optical system of the first to fourth examples described above are combined, then the ghost light 71 can be overlapped with the regular light 69 using the half mirror 63 of a wedge-shaped profile having a varying thickness.

A sixth example relates to a result of simulation conducted to reflect the blue light g ray 69 to a location outside the field of view of the user making use of the inclination angle θm of the opposing surface 66 of the half mirror 63 of a wedge-shaped profile having a varying thickness (refer to FIG. 22A). In the simulation, similarly as in the fifth example described above, the refractive index nd, the Abbe's number νd and the angular difference of refracted rays of the C and g rays are calculated from the inclination angle θm of the opposing surface 66 opposing to the half-coated surface 65 and the thickness d on the optical axis of the half mirror 63 of a wedge-shaped profile having a varying thickness. In Table 10 given below, the inclination angle θm of the opposing surface 66, the thickness d on the optical axis, the refractive index nd, the Abbe's number νd and the angular difference between refracted rays of the C and g rays are listed. From Table 10, it can be recognized readily that, in order to restrict the angular difference between the red light C ray 71 and the blue light g ray 69 within an allowable range to reflect ghost light to the outside of the field of view using the half mirror 63 of a wedge-shaped profile having a varying thickness, the condition given by the following expression:

|θm|<3.7 degrees should be satisfied.

TABLE 9

[EXAMPLE 6]

| | INCLINATION ANGLE OF INCLINED FACE (Θm°) | THICKNESS ON OPTICAL AXIS (mm) | REFRACTIVE INDEX (nd) | ABBE'S NUMBER (νd) | ANGULAR DIFFERENCE BETWEEN RAYS OF C & g RAYS |
|---|---|---|---|---|---|
| 1 | 3.6584 | 1.5 | 1.492 | 58.0 | 0.00113 |
| 2 | 3.6943 | 2.0 | 1.492 | 58.0 | 0.00114 |
| 3 | 3.7383 | 3.0 | 1.492 | 58.0 | 0 00115 |
| 4 | 3.2555 | 1.5 | 1.600 | 45.0 | 0.00160 |
| 5 | 3.2867 | 2.0 | 1.600 | 45.0 | 0.00161 |
| 6 | 3.3276 | 3.0 | 1.600 | 45.0 | 0.00163 |
| 7 | 3.5416 | 1.5 | 1.520 | 64.0 | 0.00104 |
| 8 | 3.5761 | 2.0 | 1.520 | 64.0 | 0.00105 |
| 9 | 3.6193 | 3.0 | 1.520 | 64.0 | 0.00106 |

If the sixth example and any of the results of simulation of the basic optical system of the first to fourth examples described above are combined, then the regular light 69 can be reflected to the outside of the field of view of the user using the half mirror 63 of a wedge-shaped profile having a varying thickness.

In this manner, since the half mirror 63 of a wedge-shaped profile having a varying thickness spectrally diffracts light, it is necessary to reduce the dispersion of a material by the wavelength and reduce the inclination angle, and the material of the half mirror 63 suitable for this should have an Abbe's number νd>45, and the inclination angle θm of the opposing surface 66 opposing to the half-coated surface 65 should be selected so as to be |θm|<7.3 degrees.

Having now fully described the invention, it will be apparent to one of ordinary skill in the art that many changes and modifications can be made thereto without departing from the spirit and scope of the invention as set forth herein.

What is claimed is:

1. An optical visual apparatus, comprising:
   a two-dimensional display element for displaying an image;
   a half mirror for branching an optical path from said two-dimensional display element; and
   a concave mirror for magnifying the image based on said optical path from said half mirror as a virtual image to be observed;
   said half mirror having a half-coated surface which reflects part of light of the image from said two-dimensional display element and passes the remaining part of the light therethrough while an opposing surface of said half mirror opposing to said half-coated surface is inclined with respect to said half-coated surface.

2. An optical visual apparatus according to claim 1, wherein a lens is interposed between said half mirror and an eye-ball which observes the virtual image.

3. An optical visual apparatus according to claim 1, wherein a lens is interposed between said half mirror and said two-dimensional element.

4. An optical visual apparatus according to claim 1, wherein said concave mirror is disposed in an opposing relationship to an eye-ball which observes the visual image, and a coating which passes light of an external world therethrough is provided on a reflection surface of said concave mirror.

5. An optical visual apparatus according to claim 4, further comprising means provided on the outer side of said concave mirror for adjusting an amount of light to be provided to said concave mirror from the external world.

6. An optical visual apparatus according to claim 1, wherein said concave mirror is disposed in an opposing relationship to said two-dimensional display element with said half mirror interposed therebetween.

7. An optical visual apparatus according to claim 6, further comprising means provided on the outer side of said half mirror for adjusting the amount of light to be provided to said half mirror.

8. An optical visual apparatus according to claim 1, wherein a coating for passing light from an external work therethrough is provided on a surface of said concave mirror opposite to a reflection surface.

9. An optical visual apparatus according to claim 1, further comprising means provided on the outer side of said concave mirror for adjusting the amount of light to be provided to said concave mirror.

10. An optical visual apparatus according to claim 1, wherein said half mirror is made of a material having an Abbe's number νd which satisfies νd>45.

11. An optical visual apparatus according to claim 1, wherein said opposing surface of said half mirror opposing to said half-coated surface has an inclination angle θm which satisfies

|θm|<7.3 degrees.

12. An optical visual apparatus, comprising:

a two-dimensional display element for displaying an image;

a half mirror for branching an optical path from said two-dimensional display element; and a concave mirror for magnifying the image based on said optical path from said half mirror as a virtual image to be observed;

said half mirror having a half-coated surface which reflects part of the light of the image from said two-dimensional display element and passes the remaining part of the light therethrough while an opposing surface of said half mirror opposing to said half-coated surface is inclined with respect to said half-coated surface at an inclination angle $\theta_m$ which satisfies $|\theta_m|<7.3$ degrees.

13. An optical visual apparatus, comprising:

a two-dimensional display element for displaying an image;

a half mirror for branching an optical path from said two-dimensional display element; and a concave mirror for magnifying the image based on said optical path from said half mirror as a virtual image to be observed;

said half mirror having a half-coated surface which reflects part of light of the image from said two-dimensional display element and passes the remaining part of the light therethrough while an opposing surface of said half mirror opposing to said half-coated surface is inclined with respect to said half-coated surface and said half mirror is made of a material having an Abbe's number vd>45.

* * * * *